United States Patent
Colmagro et al.

(10) Patent No.: US 11,104,445 B2
(45) Date of Patent: Aug. 31, 2021

(54) ASSEMBLY OF PARTS ASSEMBLED BY A THROUGH-SHAFT THAT CAN BE FITTED IF THE PARTS ARE IN APPROXIMATE ALIGNMENT

(71) Applicant: AIRBUS OPERATIONS (S.A.S.), Toulouse (FR)

(72) Inventors: Jérôme Colmagro, Toulouse (FR); Olivier Pautis, Merville (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 7 days.

(21) Appl. No.: 16/797,067

(22) Filed: Feb. 21, 2020

(65) Prior Publication Data
US 2020/0269988 A1 Aug. 27, 2020

(30) Foreign Application Priority Data
Feb. 22, 2019 (FR) ...................................... 1901814

(51) Int. Cl.
*B64D 27/26* (2006.01)
*B23P 19/10* (2006.01)
(Continued)

(52) U.S. Cl.
CPC .............. *B64D 27/26* (2013.01); *B23P 19/10* (2013.01); *B23P 2700/01* (2013.01); *B64D 2027/266* (2013.01)

(58) Field of Classification Search
CPC ....... B23P 19/12; B23P 19/10; B23P 2700/01; B64D 27/26; B64D 2027/266;
(Continued)

(56) References Cited

U.S. PATENT DOCUMENTS 6,330,995 B1 * 12/2001 Mangeiga .............. B64D 27/26
244/54
8,083,176 B2 * 12/2011 Lafont ................... B64D 27/26
244/54
(Continued)

FOREIGN PATENT DOCUMENTS

EP          1 129 942        9/2001
EP          1129942 A2 *    9/2001  ............. B64D 27/26
(Continued)

OTHER PUBLICATIONS

French Search Report and Written Opinion for French Patent Application No. 1901814, 10 pages, dated Oct. 25, 2019.

*Primary Examiner* — Bayan Salone
(74) *Attorney, Agent, or Firm* — Nixon & Vanderhye P.C.

(57) ABSTRACT

An assembly of parts assembled with one another by a shaft passing through orifices formed in the parts is disclosed. The shaft has a base diameter (DB) and a thickened diameter (DE) over diametrically opposed arcs at two different sections. The orifices are aligned with one another and each have a periphery having a first diameter (D1) on first diametrically opposed portions, the first diameter (D1) corresponding to the thickened diameter (DE), and a second diameter (D2), greater than the first diameter (D1), on second portions of the periphery. This allows the shaft to be fitted easily even when the orifices are only approximately aligned, and also makes removal easier.

13 Claims, 6 Drawing Sheets

(51) Int. Cl.
  *B23P 19/12* (2006.01)
  *B64F 5/10* (2017.01)
  *F16B 21/02* (2006.01)

(58) Field of Classification Search
  CPC ...... B64D 2027/262; B64F 5/10; F16B 21/02; F16B 4/004
  See application file for complete search history.

(56) References Cited

U.S. PATENT DOCUMENTS

| | | | |
|---|---|---|---|
| 8,561,941 B2 * | 10/2013 | Combes | B64D 29/06 |
| | | | 244/54 |
| 10,828,760 B2 * | 11/2020 | Guering | B64F 5/10 |
| 2008/0223983 A1 * | 9/2008 | Lafont | B64D 27/26 |
| | | | 244/54 |
| 2011/0266389 A1 * | 11/2011 | Combes | B64D 27/26 |
| | | | 244/54 |
| 2017/0182643 A1 * | 6/2017 | Guering | B25B 31/005 |

FOREIGN PATENT DOCUMENTS

| | | | |
|---|---|---|---|
| EP | 2 371 713 | 10/2011 | |
| EP | 2371713 B1 * | 8/2013 | ............ B64D 27/26 |
| FR | 2 891 245 | 3/2007 | |
| FR | 2891245 A1 * | 3/2007 | ............ B64D 27/26 |
| FR | 3093142 A1 * | 8/2020 | ............ B23P 19/12 |

* cited by examiner

ASSEMBLY OF PARTS ASSEMBLED BY A THROUGH-SHAFT THAT CAN BE FITTED IF THE PARTS ARE IN APPROXIMATE ALIGNMENT

CROSS REFERENCE TO RELATED APPLICATION

This application claims priority to and incorporates by reference French Patent Application Number 1901814, filed Feb. 22, 2019.

BACKGROUND

1. Field of the Invention

The disclosure generally relates to an assembly of parts assembled together using a shaft passing through the plurality of parts.

More specifically, the disclosure relates to a connection between an aircraft propulsion unit and a pylon supporting such a propulsion unit.

2. Description of the Related Art

An aircraft propulsion unit which in general comprises an engine which drives a fan and which is held and streamlined inside a nacelle is fixed to the structure of the aircraft by a support pylon.

The propulsion units of commercial aircraft are, in the most commonplace aircraft configuration, attached to the wing structure of the aircraft via the lower surface, referred to as underside, thereof. Each propulsion unit of an aircraft (which may for example comprise two or four of same) is generally installed at the front of this wing structure, which is to say mounted so that it cantilevers out from the front of the leading edge of the wing structure, below the level of the wing structure.

The support pylon constitutes the mechanical support between a propulsion assembly or propulsion unit, and the structure of the aircraft, for example its wing or its fuselage. The support pylon comprises a primary structure that reacts and transmits the loads to which the pylon is subjected, and a secondary structure that essentially corresponds to an aerodynamically streamline fairing which has no structural role.

The significant loadings applied between the propulsion unit and the primary structure of the support pylon are transmitted through connection interfaces, of which there are, for example, two, namely a front interface situated towards the front of the support pylon and a rear interface generally situated between the rear of the propulsion unit and a zone, for example a (longitudinally) central zone, of the support pylon.

At the rear interface access is limited. The interface itself comprises several connections. Each connection is made by a shaft passing through a plurality of orifices formed respectively in lugs (also referred to as "clevis yokes") formed on the propulsion unit on the one hand and on the support pylon on the other hand. One (or more) intermediate parts known as "shackles" may be used between the pylon and the propulsion unit, which means that each shaft passes through either one or several lugs of the pylon and through the shackle or through one or more lugs of the propulsion unit and through the shackle.

In order to limit the stresses associated with the bending moment in the shaft, a clevis type of connection is preferred over a cantilevered connection. Typically, the shackle (or other part) is inserted between two lugs of the support pylon or the nacelle. Alternatively, a lug belonging to the support pylon or the nacelle is inserted between two lugs of the other element.

The two lugs between which the shackle or a lug of the other element is introduced thus form a clevis comprising two aligned orifices.

Because the assembled parts are not intended to rotate relative to one another, and in view of the stresses that have to be withstood, an absence or near absence of clearance between the shaft and the parts through which it passes is required.

Such connections mean that the fitting of the shaft requires the orifices of the lugs and, where appropriate, that of the shackle to be perfectly aligned with one another. Obtaining good alignment that allows the fitting of the shaft is complex because of the necessary absence of clearance, and because of the mass and bulk of the parts that are to be assembled, and because of the multitude of connections that are to be formed between the parts.

The present disclosure seeks to offer a mechanical and structural connection via a shaft passing through the parts that are to be assembled, that is suited to aeronautical use, and more specifically, in the connection between an aircraft propulsion unit and a support pylon, facilitating assembly particularly with regard to the problems of aligning the orifices that the parts comprise.

SUMMARY

An assembly of parts assembled with one another is disclosed having a first part comprising a first through-orifice, a second part comprising a second through-orifice which is aligned with the first orifice of the first part, a shaft of constant section, passing through the first orifice and the second orifice so as to assemble the first part and the second part. The shaft has an external surface based on a cylinder of revolution having a base diameter and has, when viewed in transverse section, over two diametrically opposed arcs of its external surface, a uniform thickening, so that the section of the shaft has a thickened diameter on the arcs, the thickened diameter being greater than the base diameter. The first orifice and the second orifice each have, viewed in transverse section, two first diametrically opposed portions over which the periphery of the orifice has a first diameter corresponding to the thickened diameter of the shaft, and two second diametrically opposed portions over which the periphery of the orifice has a second diameter greater than the first diameter. The second portions of the periphery of the orifice are of a length substantially equal to or greater than the length of the arcs of the external surface of the shaft which have a thickening. The first orifice and the second orifice are aligned and oriented in register with one another.

The shaft can thus adopt two angular positions. In one angular position, the portions of the surface of the shaft having a thickening are in contact with the smaller-diameter parts of the orifices. That ensures a clearance-free connection between the two parts assembled via the shaft. In another angular position, the portions of the surface of the shaft having a thickening face the larger-diameter parts of the orifices. The smaller-diameter parts of the orifices therefore face portions of the surface of the shaft that have no thickening. In such a position, a clearance is created all around the shaft, making the shaft easier to fit, notably in the event of the orifices of the two parts that are to be assembled being only approximately aligned.

In such an assembly, the first part may comprise a first branch comprising the first through-orifice and a second branch, substantially parallel to the first branch, comprising a third through-orifice, the first orifice and the third orifice facing one another so that the two branches form a clevis. The second part comprising the second orifice is then positioned partially in the clevis formed between the first and second branch, the first, the second and third orifice being aligned and oriented in register with one another, the shaft passing through the first, the second and the third orifices.

The shaft may comprise, at one end, an element that allows it to be turned. For example, the element allowing the shaft to be turned may be a hexagonal, square or triangular socket. According to another example, the element allowing the shaft to be turned may be a protrusion forming a lever.

The arcs on the surface of the shaft having a thickening extend over less than 90° of angle, for example over 20° to 45° of angle, for example over 30° of angle.

The second part may be a shackle comprising two orifices to make a connection with the first part on the one hand, and a connection with a third part on the other hand, and the first portions of periphery of first diameter of each of the two orifices in the shackle are symmetric about an axis that connects the centers of the two orifices.

The second part may comprise three orifices for making three connections, these being at least one connection with the first part, and each straight line connecting the centre of one orifice to the centre of another of the three orifices passes through the first portions of first diameter of the peripheries of the orifices the centers of which it connects.

In an exemplary embodiment, the assembly is formed in which:
the first part is an aircraft propulsion unit support pylon, and the second part is an aircraft propulsion unit or a shackle or an intermediate part connected to an aircraft propulsion unit, or
the first part is an aircraft propulsion unit and the second part is an aircraft propulsion unit support pylon or a shackle or an intermediate part connected to an aircraft propulsion unit support pylon.

A method for assembling an assembly as described hereinabove is disclosed including:
at least approximately aligning the first orifice and the second orifice;
fitting the shaft through the first and second orifices by aligning the arcs of the surface of the shaft bearing a thickening with the second portions of second diameter of the peripheries of the first and second orifices;
turning the shaft so as to bring the arcs of the surface of the shaft bearing a thickening into contact with the portions of first diameter of the peripheries of the first and second orifices.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF EMBODIMENTS

Some embodiments will now be described with reference to the Figures.

Figure 1:
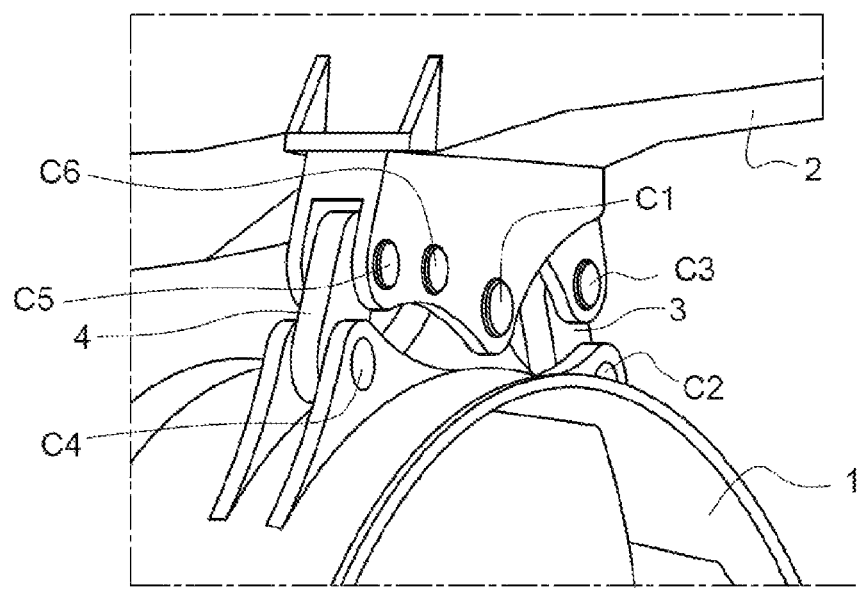
FIG. 1 is a three-dimensional perspective view of a connection between a support pylon and an aircraft propulsion unit in accordance with an exemplary embodiment.

Referring now to FIG. 1, an assembly is illustrated using a connection interface between an aircraft propulsion unit 1 and a support pylon 2. The interface depicted by way of example is situated in a substantially central longitudinal position on the support pylon, and towards the rear of the propulsion unit.

In this region, the propulsion unit 1 is essentially suspended beneath the support pylon 2.

A set of clevises C1 . . . C6 is produced to constitute the connection between the propulsion unit 1 and the support pylon 2.

A clevis connection corresponds to a connection comprising a first part forming two U-shaped parallel branches or lugs, a second part inserted between the two branches of the U, and a pin passing through the branches of the first part and of the second part.

In the example depicted, the various clevis connections C1 . . . C6 are produced either directly between the propulsion unit 1 and the support pylon 2, or between propulsion unit and an intermediate part such as a shackle which is also connected to the support pylon, or between the support pylon and an intermediate part which is also connected to the propulsion unit.

In particular, the following connections are employed:
C1: connection between the support pylon 2 and the propulsion unit 1;
C2: connection between the propulsion unit 1 and a shackle 3;
C3: connection between the support pylon 2 and the shackle 3;
C4: connection between the propulsion unit 1 and an intermediate part 4;
C5 and C6: connections between the support pylon 2 and the intermediate part 4.

Figure 2:
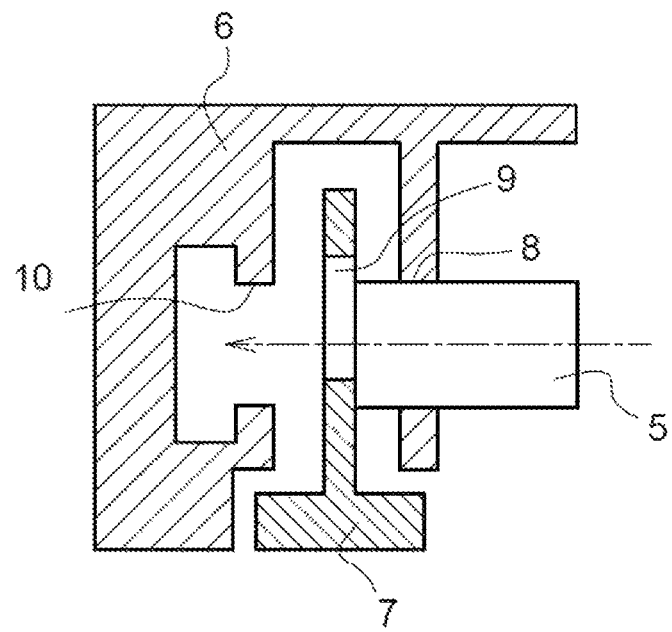
FIG. 2 is a schematic and cross-sectional view illustrating the connection between the shaft with the first part.

Each of these connections is based on the principle depicted in FIG. 2 which consists in inserting a shaft 5 into through-orifices formed in a first part 6 and in a second part 7. In particular, the shaft 5 passes in succession through a first orifice 8 in the first part 6, a second orifice 9 in the second part 7, and a third orifice 10 in the first part 6.

It is important that there should be no remaining clearance in the assembly once the first part 6 and the second part 7 have been assembled by the shaft 5. For this reason, the relative alignment of the orifices through which the shaft 5 is to be positioned needs to be perfect in order to allow the shaft to pass. FIG. 2 very schematically illustrates an imperfect alignment or misalignment, constituting a situation in which it is impossible to fit the shaft 5 because of the mechanical interference between the shaft 5 and the second part 7. However, obtaining perfect alignment is all the more complicated when the parts involved are heavy or bulky, which is for example the case with an aircraft propulsion unit. Furthermore, the significant number of connections to be made at the one same interface makes aligning the parts all the more complicated.

Figure 3:
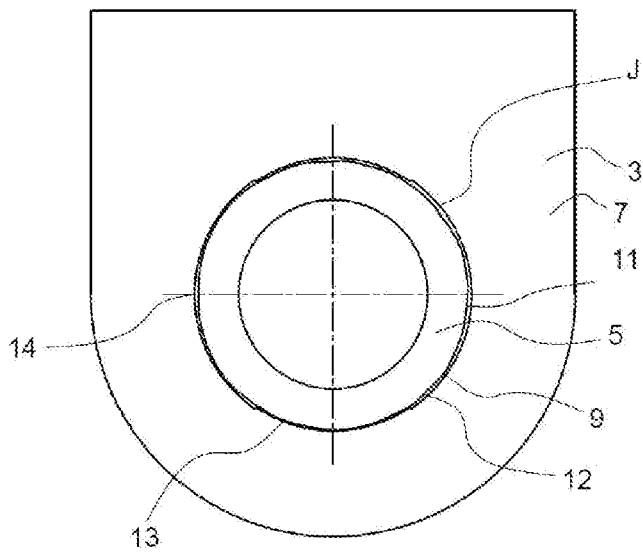
FIG. 3 depicts a schematic and cross-sectional view of one part of an assembly according to an exemplary embodiment and a corresponding shaft, in a first or disengaged position.

FIG. 3 illustrates the principle developed in the invention to make it possible to provide a solution to this problem. FIG. 3 depicts one end of the shackle 3. The shackle 3 comprises a through-orifice, in this instance corresponding to the second through-orifice 9. The shaft 5 passes through the orifice in the shackle 3.

Further details regarding the shaft 5 and the orifice in the shackle 3 are described hereinafter with reference to FIGS. 8 and 9, respectively.

Figure 8:
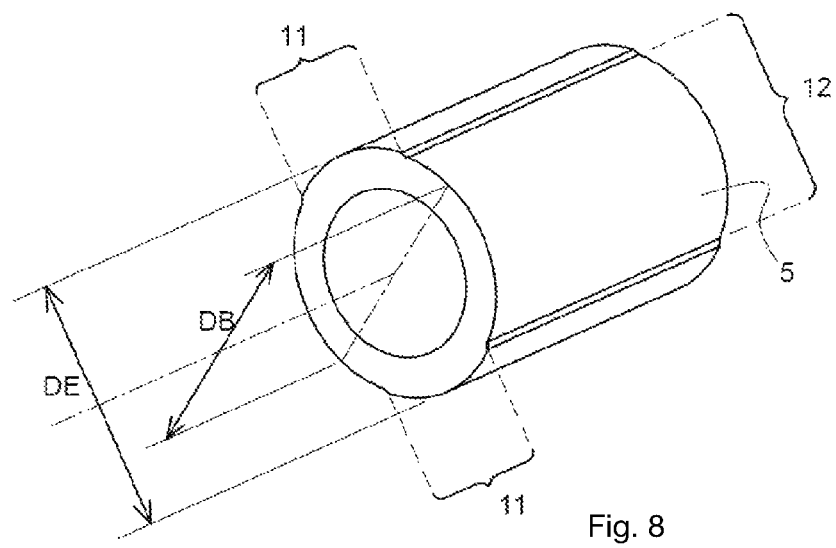
FIG. 8 depicts a three-dimensional schematic view of one example of a shaft that can be used in the connection.

FIG. 8 depicts the shaft 5. In the example depicted this is a hollow shaft, but it could, without departing from the scope of the invention, be a solid shaft.

The shaft 5 has a constant transverse section. As can be seen in FIG. 8, the section of the shaft 5 is substantially cylindrical. However, unlike a shaft traditionally used, the shaft 5 is not have a purely cylindrical configuration but on its surface has two diametrically opposed thickened zones. Thus, viewed in section, the shaft 5 has two diametrically opposed arcs 11 having a thickening compared with the rest of the surface of the shaft 5. Viewed in cross-section, the shaft 5 therefore has two diametrically opposed arcs 11 over which the shaft has a thickened diameter DE, whereas it has a base diameter DB (smaller than the thickened diameter DE) over the rest of its surface.

The transition between the surfaces of the shaft 5 that have the base diameter DB and those that have the thickened diameter DE is achieved gently, using rounded surfaces, or at the very least progressively. That avoids there being too abrupt a variation in section which could be detrimental to the mechanical behavior of the shaft, particularly in the case of it being stressed in repeated loading cycles that could give rise to mechanical fatigue.

The arcs 11 of the shaft that have a thickening each extend over less than 90° of angle, which means that the majority of the surface does not have any thickening with respect to the base diameter DB. In particular, these arcs extend over an angle β of 30° in the example depicted here, and as shown in FIG. 4.

Figure 9:
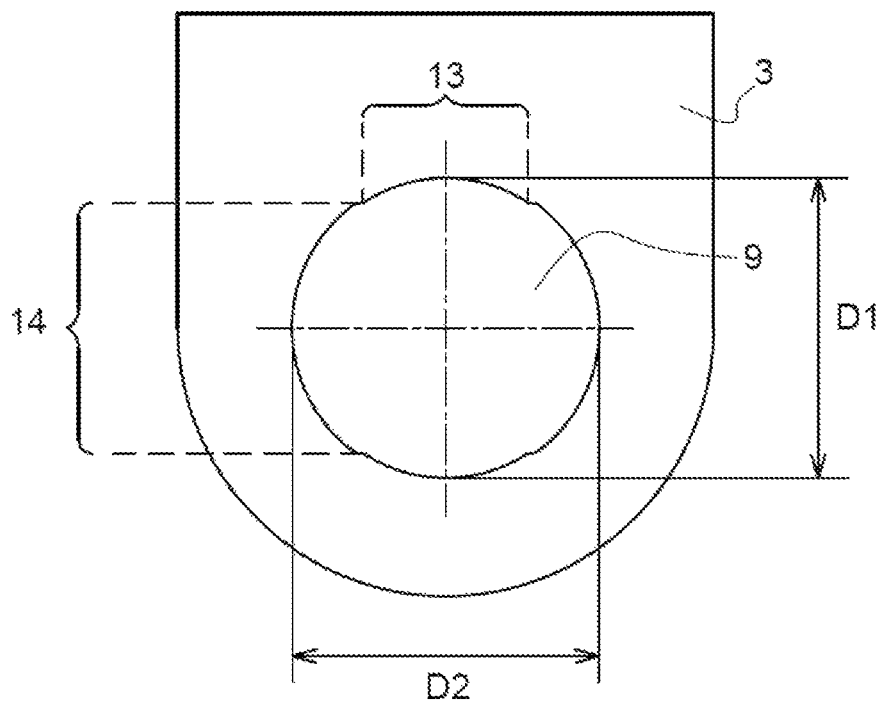
FIG. 9 depicts a schematic view of an orifice passing through a part used in an exemplary embodiment.

FIG. 9 depicts the second orifice 9, formed in the shackle 3, and intended to accept the shaft 5. The orifice depicted has a constant section. As the orifice is seen in transverse section, its periphery comprises two first diametrically opposed portions 13 having a first diameter D1 corresponding to the thickened diameter DE of the shaft. What is meant by "corresponding" is that the thickened diameter DE can be introduced without clearance, or with negligible clearance, and without tightness, into the first diameter D1.

Figure 4:
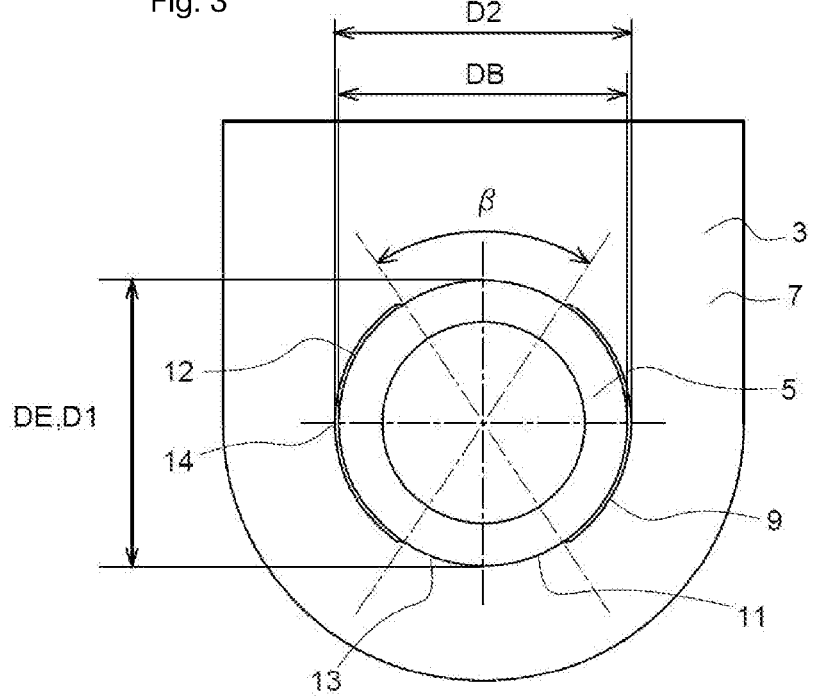
FIG. 4 depicts the part and the shaft of FIG. 3 in a second or engaged position.

In the example depicted here, these first portions 13 have a dimension equal to that of the arcs 11 of the shaft 5 having a thickening and therefore extend over an angle of 30°, as depicted in FIG. 4.

Over the rest of its periphery, namely over two second diametrically opposed portions 14, the orifice has a second diameter D2 greater than D1. The second portions of the periphery of the orifice, where the orifice has the second diameter D2, are of a length at least equal to the length of the arcs of the shaft having a thickening, thereby allowing the shaft 5 to adopt the so-called disengaged position in the orifice.

The transition between the portions of the periphery of the orifice that have the first diameter D1 and those that have the second diameter D2 is achieved gently, via rounded surfaces, or at least progressively. That avoids too abrupt of a variation in section which could be detrimental to the mechanical behavior of the shackle 3, notably in the event of stress created in repeated loading cycles that may give rise to mechanical fatigue.

The difference between the first diameter and the second diameter is such that it is clearly visible for illustration purposes in FIG. 9 and in order to illustrate one aspect of the invention, but this difference is generally smaller, for example representing a few tenths of a millimeter. Likewise, the regions of transition between the first-diameter and second-diameter portions appear significant in FIG. 9 but are in practice generally negligible in size by comparison with the dimensions of the orifice periphery portions of first diameter and of second diameter.

Thus, the following relationships are established:

DB is less than DE;

DE is equal to D1 give or take a negligible clearance that allows a shaft of diameter DE to be introduced without stress into an orifice of diameter D1; and, D1 is less than D2.

Thus, as depicted in FIG. 3, it is possible to insert the shaft 5 into the second orifice 9 by placing the diametrically opposed arcs 11 that have a thickening so that they face the portions of the orifice at which the periphery of the latter has the second diameter D2. In this case, the portions of the periphery of the orifice that have the first diameter D1 face surfaces of the shaft that do not have thickening.

The result of this is that, in this position, known as the "disengaged" position, and as depicted in FIG. 3, the shaft around the entirety of its external surface has a clearance (J) with respect to the orifice into which it is inserted. This peripheral clearance makes it easier to fit the shaft into the orifice.

The first part 6 and the second part 7 each have an orifice configured in this way. The first orifice 8 in the first part 6 and the second orifice 9 in the second part 7 are also substantially oriented in register with one another so that the shaft 5 can be inserted with a periphery clearance with respect to the first orifice 8 and to the second orifice 9. Oriented in register with one another means that the first portions of first diameter D1 of the first orifice 8 face first portions of first diameter D1 of the second orifice 9, and that the second portions of second diameter D2 of the first orifice 8 face the second portions of second diameter D2 of the second orifice 9.

It is thus possible to insert the shaft with clearance in such a way that it passes through the first part 6 and the second part 7 even when the alignment between the first orifice 8 and the second orifice 9 is imperfect.

This principle remains valid and repeatable with a third orifice, for example to form a clevis connection, or even with more orifices and/or parts to be assembled.

FIG. 4 depicts the shackle 3 and the shaft 5 depicted in FIG. 3, the shaft 5 having been rotated through 90° about its main axis.

In the angular position of the shaft 5 that is depicted in FIG. 4, referred to as the "engaged" position, the diametrically opposed arcs 11 of the shaft, having a thickening, are brought into register with the first portions 13 of the periphery of the orifice having the first diameter D1. This results in contact between the diametrically opposed arcs 11 and the first portions 13 so that the shaft 5 is held without clearance in the orifice. With the shaft in this position, a clearance-free connection is thus established. Furthermore, turning the shaft 5 to bring it into the angular position of FIG. 4 has the consequence of correcting any defective alignment of the parts and of their respective orifices that may have existed at the time of insertion of the shaft.

Turning the shaft to move from the angular position depicted in FIG. 3 to that depicted in FIG. 4 and vice versa, or more generally to make it possible to adjust the angular position of the shaft 5, may be achieved in various ways. In particular, the shaft 5 may comprise an element that allows it to be turned. Any non-circular element may thus be suitable. Two preferred examples are depicted in FIGS. 5 and 6.

Figure 5:
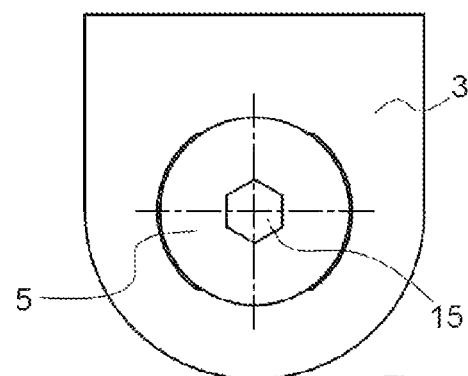
FIG. 5 depicts a schematic view of an element that allows the shaft to be turned in order to adjust its angle.

Thus, as depicted in FIG. 5, the shaft 5 may at one of its ends have a socket 15 into which a tool of corresponding shape can be inserted. The socket 15 may, non-exhaustively and non-limiting, have a hexagonal shape (as in the example depicted in FIG. 5), or a triangular, square, etc. shape.

Moreover, the reverse principle may be applied, namely a shaft 5 having an end of non-circular shape, which can be inserted into a tool having a corresponding female part.

Figure 6:
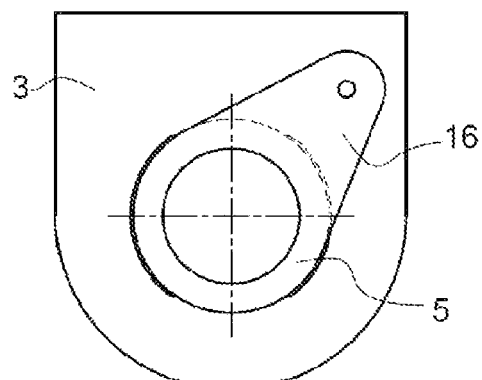
FIG. 6 depicts a schematic view of an element that allows the shaft to be turned.

Another example of an element that allows the shaft 5 to be turned is depicted in FIG. 6, in the form of a lug 16. The lug 16, rigidly connected to the shaft 5 or formed integrally therewith, can be twisted, causing the shaft to turn. Quite obviously, according to the principle illustrated in FIG. 6, any geometric protrusion can be used to allow the shaft to be turned.

Figure 7:
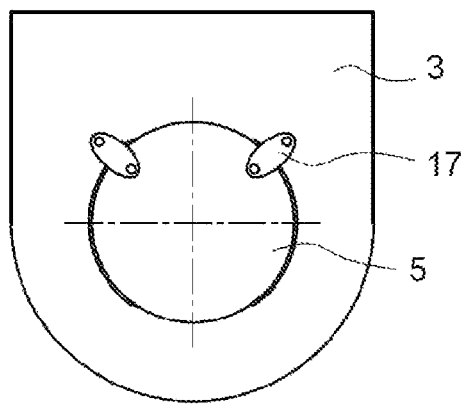
FIG. 7 depicts a schematic view of one aspect of an exemplary part that can be used in the invention.

Once the shaft 5 has been positioned with respect to the various orifices through which it passes in the angular position of FIG. 4, the clearance-free connection between the parts that are to be assembled is formed and the shaft must not be turned any further when the parts thus assembled are in use. In order to ensure that the shaft 5 does not turn, as its turning could create detrimental clearance in the connection, shaft immobilizing means 17 are provided in one embodiment of the invention. FIG. 7 depicts such immobilizing means 17 in the form of plates connected on the one hand to the shaft 5 and on the other hand to the shackle 3 (or any other fixed part of the assembly).

When the shaft is in the angular position depicted in FIG. 4, only the diametrically opposed arcs 11 of the shaft having a thickening and the first portions 13 of orifice periphery with first diameter D1 in contact with the arcs contribute to the connection and allow the transmission of the loads applied thereto. It is therefore preferable for the dimensions of these arcs and portions to be equal or similar in order to maximize the contact areas.

Figure 10:
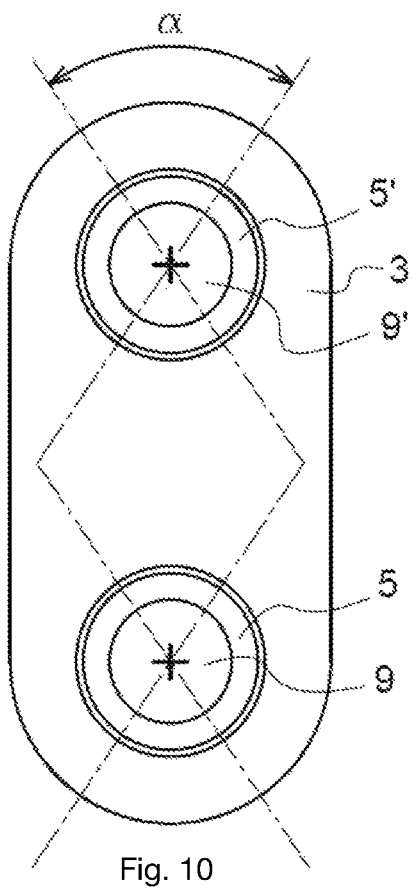
FIG. 10 depicts a schematic view of a shackle suited to being used in an assembly.

A shackle 3 like the one depicted in FIG. 10 is suited to the transmission essentially of tensile and compressive loads applied along an axis A connecting the centers of the two second orifices 9, 9' formed therein. Two shafts 5, 5' are positioned therein.

On the circular-arc-shaped contact surface formed between each shaft 5, 5' and the orifice in which it is fitted, the tensile loadings are applied essentially over an angle α of 30° distributed symmetrically on either side of the axis A. Thus, the angle of extension β of the arcs of the shaft having a thickening and in register with the portions of the orifice having a periphery of first diameter D1 is particularly well suited to this configuration. Furthermore, the portions of periphery of first diameter D1 of each of the two orifices of the shackle 3 are symmetrical about the axis A.

Figure 11:
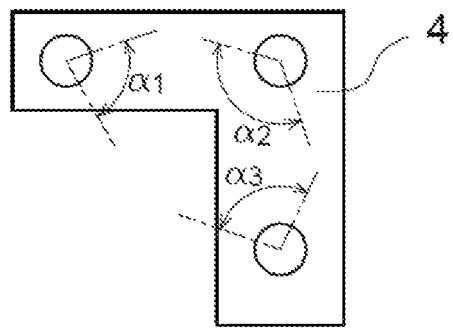
FIG. 11 depicts a schematic view of one aspect in accordance with an exemplary embodiment; and, FIG. 12 depicts a schematic view of a first part and a second part assembled together using a pin.

FIG. 11 depicts an intermediate part 4 the geometry of which corresponds substantially to that of the intermediate part 4 of FIG. 1. This part comprises three orifices to create three connections according to the principle expounded in the invention. In the configuration depicted, the loads applied to the part are essentially spread loads, at the three connections, at respective angles of spread α1, α2 and α3 which differ in terms of value and in terms of orientation. In such configurations in particular, the value of the angle β over which the thickenings and, where appropriate, the orifice periphery portions of first diameter D1 extend, may be increased for example up to 90°. Furthermore, each straight line connecting the centre of one orifice to the centre of another orifice of an intermediate part 4 passes through the first-diameter periphery portions of the orifices the centers of which it connects. This makes it possible to ensure that each connection formed is configured to react the loads that are applied to it.

Figure 12:
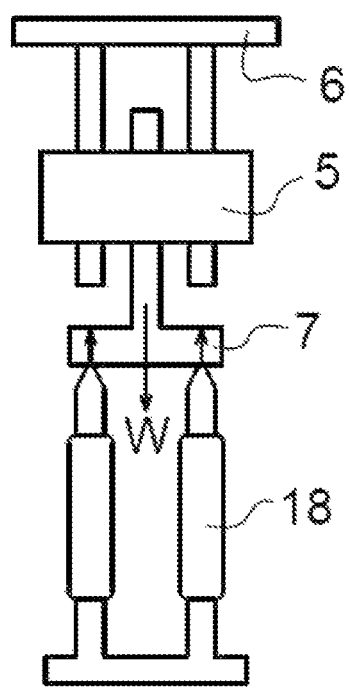

FIG. 12 illustrates a second advantage afforded by the invention, in the context of the dismantling of a connection formed as described hereinabove. FIG. 12 schematically depicts the assembly between a first part 6 and a second part 7 using a pin 5. The dismantling of this assembly is achieved by removing the pin 5. Nevertheless, when the assembly is under stress (for example when an aircraft propulsion unit 1 forming the second part 7 is suspended from a support pylon 2 forming the first part 6, and its weight W is applied fully or partially to the connection), the withdrawal of the shaft 5 is difficult if not to say impossible. In order to allow the shaft to be withdrawn it is necessary to provide bearer means 18 to compensate for the weight W of the second part 7 and cancel the loads it generates in the connection. If the bearer means 18 are unable to completely cancel the loads in the connection, which corresponds to perfect and stress-free alignment of the orifices of the first part 6 and of the second part 7, the shaft remains difficult to extract.

By implementing an assembly according to the invention, this problem is also solved. In order to allow such an assembly to be dismantled, the shaft 5 is turned from the angular position depicted in FIG. 4 to the angular position depicted in FIG. 3 (after withdrawal, where appropriate, of the immobilizing means 17). In this case, a peripheral clearance is formed around the shaft, so that the bearing means 18 are not maintained in perfect alignment of the orifices of the first part 6 and of the second part 7. This clearance allows the shaft to be extracted with ease. Likewise, if several connections are employed as in the example of FIG. 1, it is possible to extract each connecting shaft in turn (and, where appropriate, to refit them) as long as there remains a sufficient quantity of connections still made to react the loads that had been borne by the connection the shaft of which has been extracted.

The invention thus developed makes it possible to make up an assembly by assembling two parts or more using a shaft passing through the parts, and makes it possible to alleviate the difficulty of achieving perfect alignment between the orifices through which the shaft passes. As a secondary result it allows the assembly to be dismantled easily, even when stresses are still being applied to it. It can be applied to any field in which a mechanical assembly by a shaft passing through several parts is implemented. It finds particular applications in the field of aeronautics and is particularly well suited to the creation of connections at an interface between an aircraft propulsion unit and a support pylon.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly of parts assembled with one another, comprising:
   a first part comprising a first through-orifice;
   a second part comprising a second through-orifice which is aligned with the first orifice of the first part;
   a shaft passing through the first orifice and the second orifice so as to assemble the first part and the second part;
   wherein the shaft has an external surface based on a cylinder of revolution having a base diameter (DB) and has, when viewed in transverse section, over two diametrically opposed arcs of its external surface, a uniform thickening, so that the section of the shaft has a thickened diameter (DE) on the arcs, the thickened diameter (DE) being greater than the base diameter (DB);
   wherein the first orifice and the second orifice each have, viewed in transverse section, two first diametrically opposed portions over which the periphery of the orifice has a first diameter (D1) corresponding to the thickened diameter (DE) of the shaft, and two second diametrically opposed portions over which the periphery of the orifice has a second diameter (D2) greater than the first diameter (D1);
   wherein the second portions of the periphery of the orifice being of a length substantially equal to or greater than the length of the arcs of the external surface of the shaft which have a thickening; and,
   wherein the first orifice and the second orifice being aligned and oriented in register with one another.

2. The assembly according claim 1, wherein the first part further comprises a first branch comprising the first through-orifice and a second branch, substantially parallel to the first branch, comprising a third through-orifice, wherein the first orifice and the third orifice facing one another so that the two branches form a clevis,
   wherein the second part comprising the second orifice being positioned partially in the clevis formed between the first and second branch, the first, the second and third orifice being aligned and oriented in register with one another,
   wherein the shaft passing through the first, the second and the third orifices.

3. The assembly according to claim 1, wherein the shaft comprises, at one end, an element that allows it to be turned.

4. The assembly according to claim 3, wherein the element allowing the shaft to be turned is a hexagonal, square or triangular socket.

5. The assembly according to claim 3, wherein the element allowing the shaft to be turned is a protrusion forming a lever.

6. The assembly according to claim 1, wherein the arcs on the surface of the shaft having a thickening extend over less than 90° of angle.

7. The assembly according to claim 1, wherein the second part is a shackle comprising two orifices to make a connection with the first part on the one hand, and a connection with a third part on the other hand, wherein the first portions of periphery of first diameter (D1) of each of the two orifices in the shackle are symmetric about an axis (A) that connects the centers of the two orifices.

8. The assembly according to claim 1, wherein the second part further comprises three orifices for making three connections, these being at least one connection with the first part, wherein each straight line connecting the centre of one orifice to the centre of another of the three orifices passes through the first portions of first diameter (D1) of the peripheries of the orifices the centers of which it connects.

9. The assembly according to claim 1, wherein:
   the first part is an aircraft propulsion unit support pylon, and the second part is an aircraft propulsion unit or a shackle or an intermediate part connected to an aircraft propulsion unit, or
   the first part is an aircraft propulsion unit and the second part is an aircraft propulsion unit support pylon or a shackle or an intermediate part connected to an aircraft propulsion unit support pylon.

10. A method for assembling an assembly according to claim 1, comprising:
    aligning at least approximately the first orifice and the second orifice;
    fitting the shaft through the first and second orifices by aligning the arcs of the surface of the shaft bearing a thickening with the second portions of second diameter (D2) of the peripheries of the first and second orifices;
    turning the shaft so as to bring the arcs of the surface of the shaft bearing a thickening into contact with the portions of first diameter (D1) of the peripheries of the first and second orifices.

11. The assembly according to claim 1, wherein the arcs on the surface of the shaft having a thickening extend over 20° to 45° of angle.

12. The assembly according to claim 1, wherein the arcs on the surface of the shaft having a thickening extend over 30° of angle.

13. An assembly of components, comprising:
    a first part comprising a first through-orifice;
    a second part comprising a second through-orifice, wherein the first through-orifice of the first part and the second through-orifice of the second part are aligned;
    a shaft passing through the first through-orifice and the second through-orifice;
    wherein the shaft is substantially cylindrical having a base diameter (DB), and two diametrically opposed outwardly bulging arcs on an external surface thereof having a thickened diameter (DE), wherein the thickened diameter (DE) of the shaft is greater than the base diameter (DB) of the shaft;

wherein the first through-orifice and the second through-orifice each have two first diametrically transverse opposed portions over which the periphery of the orifice has a first diameter (D1) corresponding to the thickened diameter (DE) of the shaft, and two second diametrically opposed portions over which the periphery of the orifice has a second diameter (D2) greater than the first diameter (D1).

\* \* \* \* \*